US012014439B2

United States Patent
Hong et al.

(10) Patent No.: US 12,014,439 B2
(45) Date of Patent: Jun. 18, 2024

(54) METHOD FOR PROTECTING COPYRIGHT OF LIGHT FIELD CONTENT

(71) Applicant: Korea Electronics Technology Institute, Seongnam-si (KR)

(72) Inventors: Sung Hee Hong, Seoul (KR); Young Min Kim, Seoul (KR); Ji Soo Hong, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 177 days.

(21) Appl. No.: 17/768,528

(22) PCT Filed: Oct. 15, 2019

(86) PCT No.: PCT/KR2019/013456
§ 371 (c)(1),
(2) Date: Apr. 13, 2022

(87) PCT Pub. No.: WO2021/075590
PCT Pub. Date: Apr. 22, 2021

(65) Prior Publication Data
US 2023/0245259 A1    Aug. 3, 2023

(30) Foreign Application Priority Data
Oct. 14, 2019    (KR) .................. 10-2019-0126724

(51) Int. Cl.
*G06T 1/00*    (2006.01)
*H04N 1/32*    (2006.01)

(52) U.S. Cl.
CPC ......... *G06T 1/0021* (2013.01); *H04N 1/3224* (2013.01); *G06T 2201/0051* (2013.01)

(58) Field of Classification Search
CPC ......... G06T 1/0021; G06T 2201/0051; H04N 1/3224; H04N 13/139; H04N 13/156;
(Continued)

(56) References Cited

U.S. PATENT DOCUMENTS

2004/0228409 A1* 11/2004 Ryou .................. H04N 19/196
                                                              375/E7.138
2013/0002827 A1*  1/2013 Lee ....................... G06T 1/0007
                                                              348/E13.025

FOREIGN PATENT DOCUMENTS

KR    10-2005-0102155 A    10/2005
KR    10-2011-0139418 A    12/2011
KR    10-2015-0104305 A     9/2015

OTHER PUBLICATIONS

Asikuzzaman, Md, et al. "An Overview of Digital Video Watermarking" IEEE Transactions on Circuits and Systems for Video Technology 28.9, Sep. 2018: pp. 2131-2153.
(Continued)

*Primary Examiner* — Christopher Wait
(74) *Attorney, Agent, or Firm* — NSIP Law

(57) ABSTRACT

Provided is a method for inserting a copyright information indication as a means for protecting the copyright of LF content which can be played back as multi-viewpoint images, wherein the copyright information indication is only inserted in images of a specific viewpoint. A method for generating multi-viewpoint images according to an embodiment of the present invention includes the steps of: generating multi-viewpoint images; inserting a specific information indication in images of a specific viewpoint among the generated multi-viewpoint images; and storing the multi-viewpoint images in which the specific information indication has been inserted. Accordingly, the copyright of LF content, which are expensive multi-viewpoint images, can be protected by inserting the copyright information indication only in the images of the specific viewpoint.

8 Claims, 7 Drawing Sheets

(58) Field of Classification Search
CPC .............. H04N 13/172; H04N 13/243; H04N 21/2541; H04N 21/23614; H04N 21/816
See application file for complete search history.

(56) References Cited

OTHER PUBLICATIONS

Korean Office Action issued on Jan. 26, 2021, in counterpart of Korean Patent Application No. 10-2019-0126724 (2 pages in English and 4 pages in Korean).
Korean Office Action issued on Jul. 27, 2021, in counterpart Korean Patent Application No. 10-2019-0126724 (2 pages in English and 3 pages in Korean).

* cited by examiner

METHOD FOR PROTECTING COPYRIGHT OF LIGHT FIELD CONTENT

CROSS REFERENCE TO RELATED APPLICATIONS

This application is a U.S. National Stage Application of International Application No. PCT/KR2019/013456, filed on Oct. 15, 2019, which claims the benefit under 35 USC 119(a) and 365(b) of Korean Patent Application No. 10-2019-0126724, filed on Oct. 14, 2019, in the Korean Intellectual Property Office, the entire disclosure of which is incorporated herein by reference for all purposes.

TECHNICAL FIELD

The present disclosure relates to technology for displaying copyright information, and more particularly, to a method for inserting copyright information into a three-dimensional (3D) content such as a light field (LF) content.

BACKGROUND ART

A related-art method for protecting a copyright of an image content may focus on hiding a corresponding mark by using a watermark so as to make the mark invisible when it is reproduced, and may insert a watermark by using an encryption method so as to protect information related to a copyright of a content from being easily exposed when it is detected.

However, an LF content provides different image information according to a viewpoint, and accordingly, it may be very difficult to perform the method of inserting copyright information and the method of detecting.

Accordingly, there is a demand for a method for inserting copyright information into an LF content easily and simply. In addition, a copyright information indication is required to minimize a hindrance to appreciation of an LF content.

DISCLOSURE

Technical Problem

The present disclosure has been developed in order to address the above-discussed deficiencies of the prior art, and an object of the present disclosure is to provide a method for inserting a copyright information indication only to images of a specific viewpoint, as a solution for protecting a copyright of an LF content which is able to reproduce multi-viewpoint images.

Technical Solution

According to an embodiment of the present disclosure to achieve the above-described object, a multi-viewpoint image generation method includes: generating multi-viewpoint images; inserting a specific information indication into an image of a specific viewpoint among the generated multi-viewpoint images; and storing the multi-viewpoint images into which the specific information indication is inserted.

The inserting may include inserting the specific information indication into at least one of images of edge viewpoints.

The specific information indication may be a copyright information indication.

The multi-viewpoint images may be light field (LF) images.

According to another aspect of the present disclosure, there is provided a multi-viewpoint image reproduction method including: acquiring multi-viewpoint images; and reproducing the acquired multi-viewpoint images, wherein the multi-viewpoint images are images in which a specific information indication is inserted into an image of a specific viewpoint.

The multi-viewpoint images may be images in which a measurement information indication is inserted into at least one of images of edge viewpoints.

The specific information indication may be a copyright information indication.

The multi-viewpoint images may be light field (LF) images.

Advantageous Effects

According to embodiments of the present disclosure as described above, a copyright of an LF content which are expensive multi-viewpoint images may be protected by inserting a copyright information indication only to images of a specific viewpoint.

In addition, according to embodiments of the present disclosure, since a copyright information indication is inserted into images of first and last viewpoints of an LF content, a hindrance to appreciation of the LF content due to the copyright information indication may be minimized.

BEST MODE

Hereinafter, the present disclosure will be described in more detail with reference to the drawings.

Figure 1:
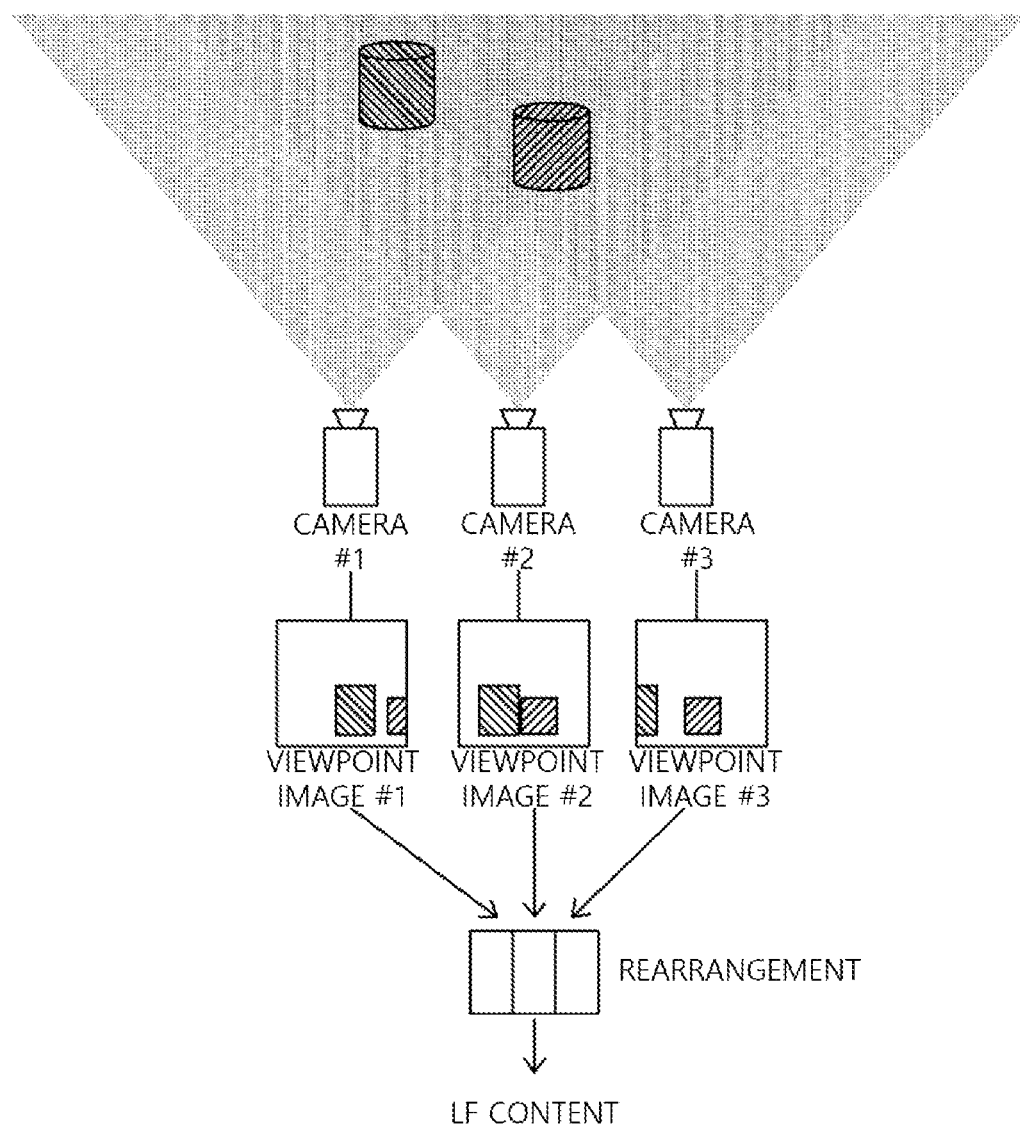
FIG. 1 is a view provided to explain a method of generating an LF content.

FIG. 1 is a view provided to explain a method of generating a light field (LF) content. As shown in FIG. 1, the LF content is made by recording (or rendering) images of various viewpoints and then combining the respective viewpoint images through a rearrangement algorithm.

Figure 2:
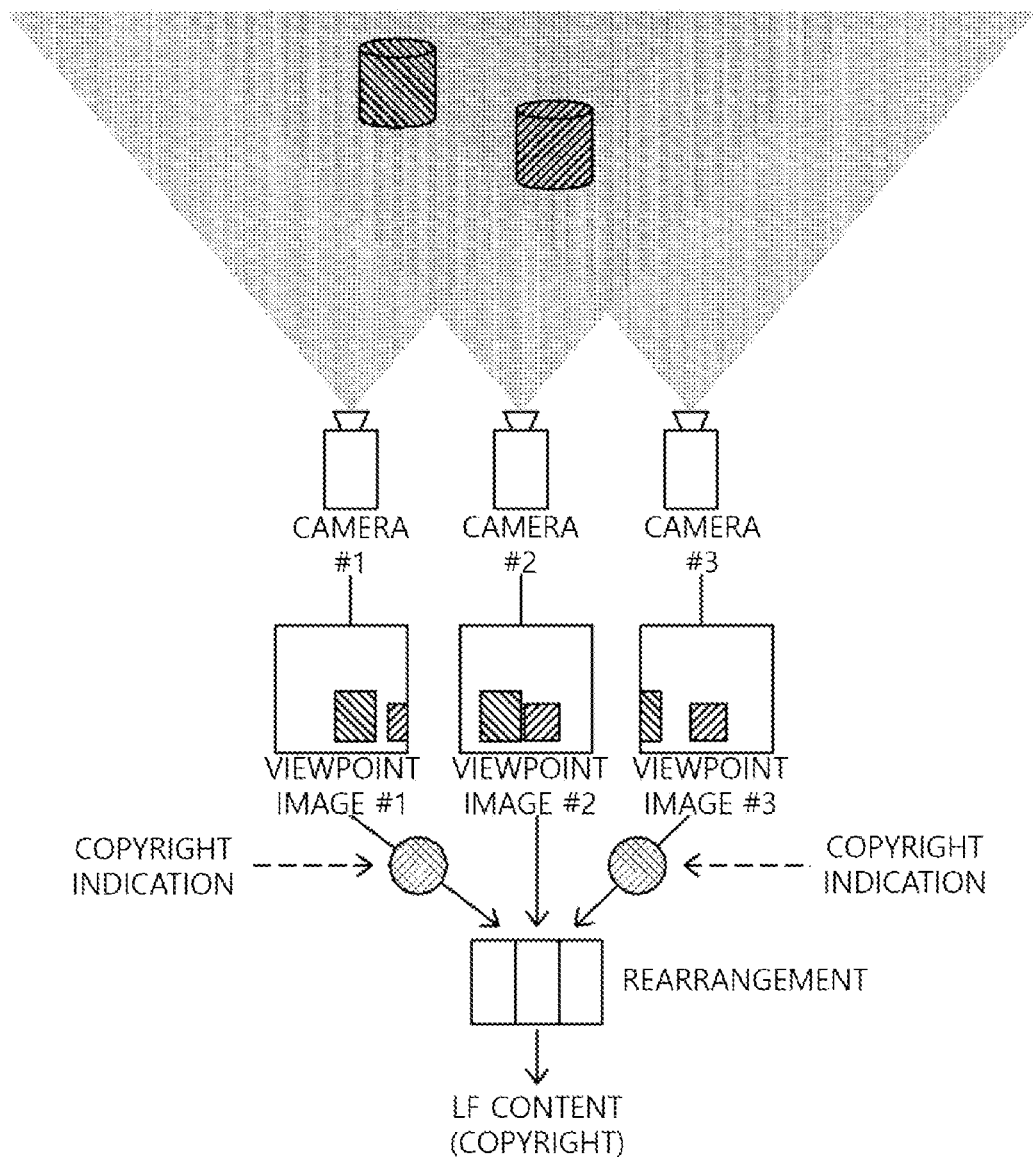
FIG. 2 is a view provided to explain a concept of a method of inserting copyright indication information into an LF content according to an embodiment of the present disclosure.

FIG. 2 is a view provided to explain a concept of a method of inserting copyright indication information into an LF content according to an embodiment of the present disclosure. As shown in the drawing, an LF content with copyright information being inserted thereinto is made by inserting copyright indication information into an image of a leftmost viewpoint and an image of a rightmost viewpoint and then re-arranging the images.

When an LF content to make is formed of images of 100 viewpoints, copyright indication information may be inserted into a first viewpoint image of the leftmost viewpoint and a $100^{th}$ viewpoint image of the rightmost viewpoint. Accordingly, the copyright indication information is not visible through most of the viewpoint images, that is, the $2^{nd}$ to $99^{th}$ viewpoint images, and the copyright indication information is visible only through the outermost images, so that a hinderance to appreciation of the LF content may be minimized.

Figure 3:
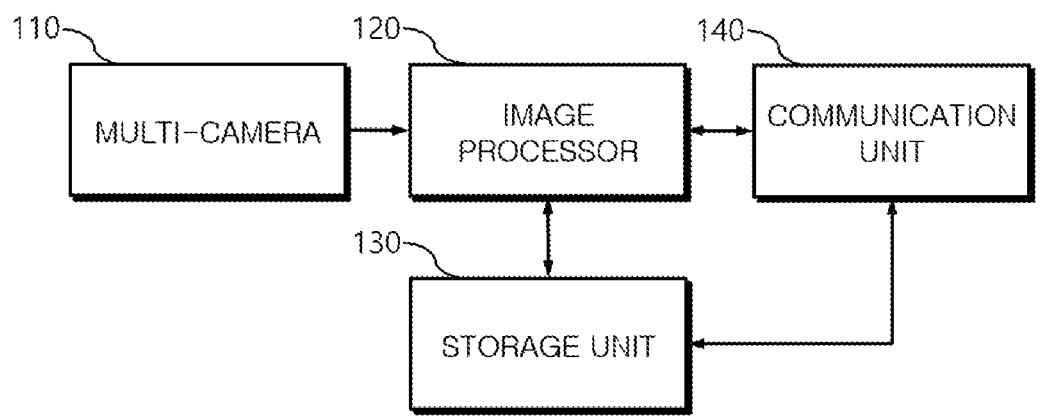
FIG. 3 is a block diagram of an LF content generation apparatus according to an embodiment of the present disclosure.

FIG. 3 is a block diagram of an LF content generation apparatus according to an embodiment. The LF content generation apparatus according to an embodiment of the present disclosure may include a multi-camera 110, an image processor 120, a storage unit 130, and a communication unit 140 as shown in FIG. 3.

The multi-camera 110 is a set of photographing devices which generate multi-viewpoint images by photographing an object/scene from different viewpoints.

The image processor 120 makes an LF content with copyright information being inserted thereinto, by inserting a copyright information indication into an image of a leftmost viewpoint (first viewpoint) and an image of a rightmost viewpoint (last viewpoint) among the multi-viewpoint images, and then rearranging the images.

The storage unit 130 stores the LF content in which the copyright information indication is inserted into the images of the leftmost/rightmost viewpoints by the image processor 120.

The communication unit 140 transmits the LF content stored in the storage unit 130 to an LF content reproduction apparatus, which will be described below, through a network.

Figure 4:
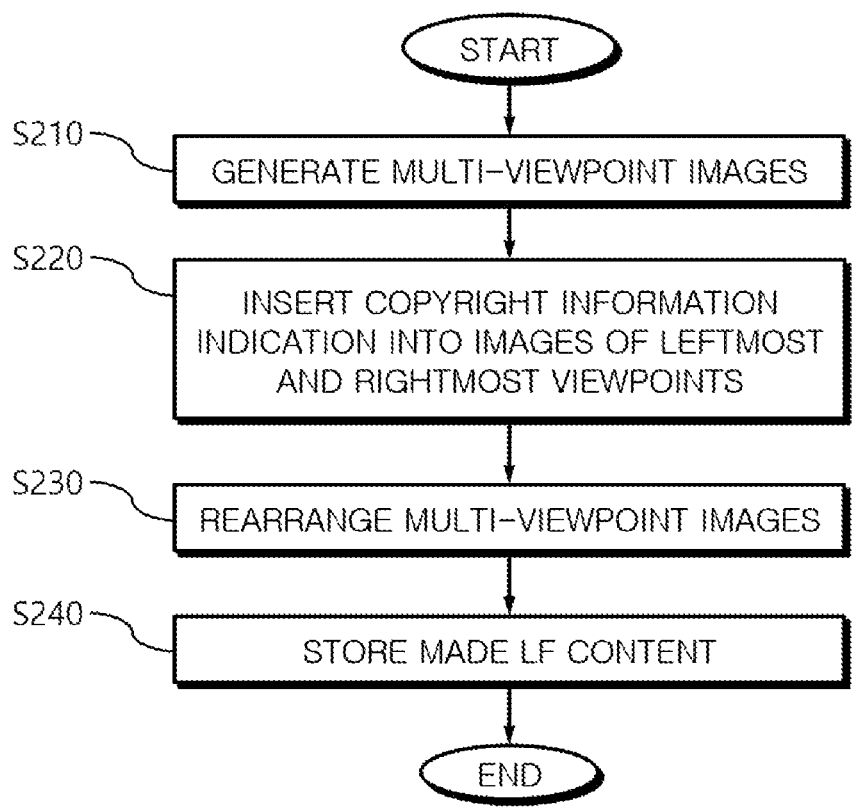
FIG. 4 is a flowchart provided to explain an LF content generation method according to another embodiment of the present disclosure.

Hereinafter, a process of generating an LF content displaying copyright information by the apparatus shown in FIG. 3 will be described in detail with reference to FIG. 4. FIG. 4 is a flowchart provided to explain an LF content generation method according to another embodiment of the present disclosure.

As shown in the drawing, when the multi-camera 110 of the LF content generation apparatus generates multi-viewpoint images (S210), the image processor 120 inserts a copyright information indication into images of the leftmost viewpoint and the rightmost viewpoint among the multi-viewpoint images (S220).

Next, the image processor 120 makes an LF content by rearranging the multi-viewpoint image (S230), and stores the LF content in the storage unit 130 (240).

Figure 5:
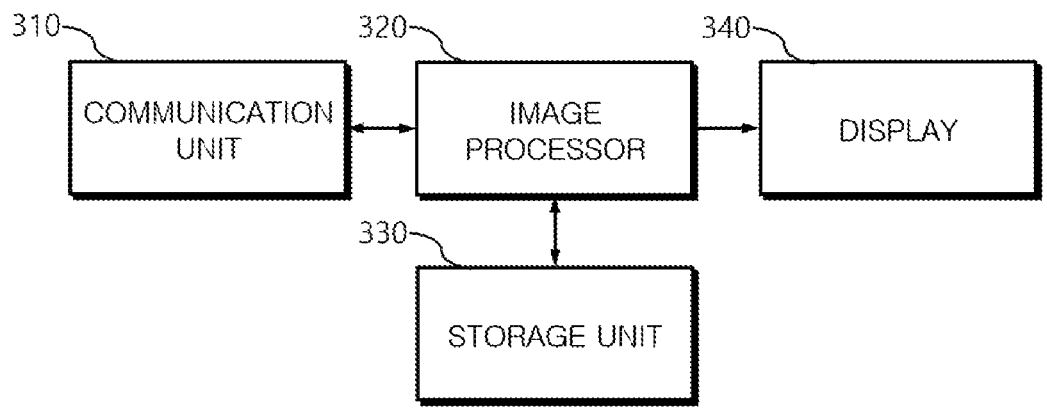
FIG. 5 is a block diagram of an LF content reproduction apparatus according to still another embodiment of the present disclosure.

FIG. 5 is a block diagram of an LF content reproduction apparatus according to still another embodiment of the present disclosure. As shown in FIG. 5, the LF content reproduction apparatus according to an embodiment of the present disclosure may include a communication unit 310, an image processor 320 a storage unit 330, and a display 340.

The communication unit 310 receives and acquires an LF content from an LF content generation apparatus through a network. A copyright information indication may be inserted into the LF content acquired by the communication unit 310.

The image processor 320 performs image processing necessary for reproducing the LF content received through the communication unit 310. The storage unit 330 provides a storage space necessary for the image processor 320 to function.

The display 340 displays the LF content image-processed by the image processor 320. The LF content may have the copyright information indication inserted into an image of a leftmost viewpoint and an image of a rightmost viewpoint.

Figure 6:
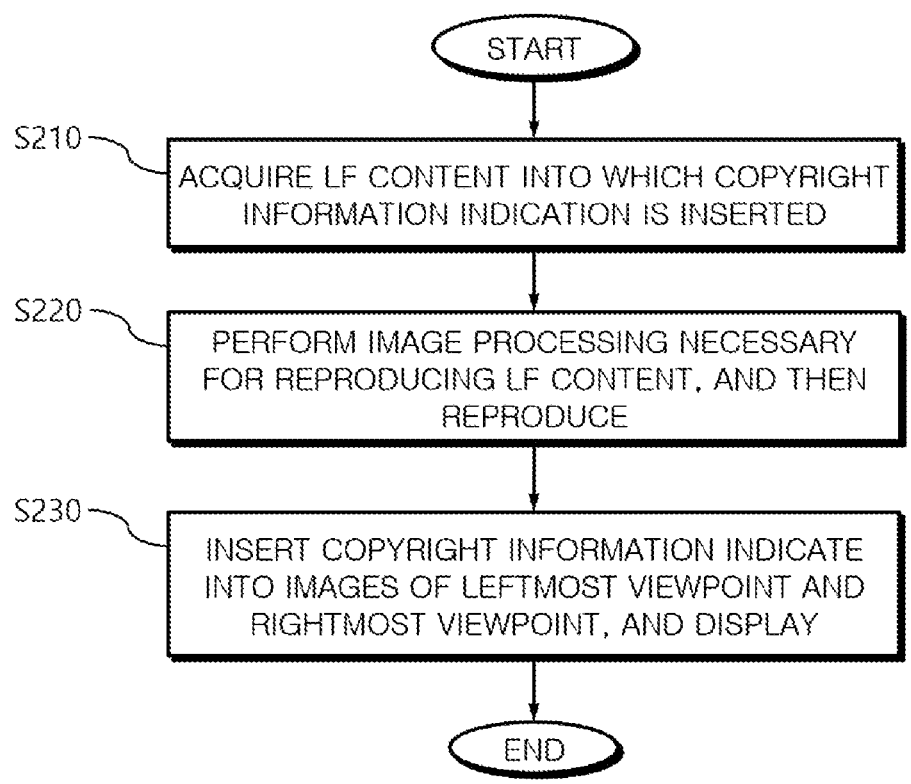
FIG. 6 is a flowchart provided to explain an LF content reproduction method according to yet another embodiment of the present disclosure.

Hereinafter, a process of reproducing an LF content displaying copyright information by the apparatus shown in FIG. 5 will be described in detail with reference to FIG. 6. FIG. 6 is a flowchart provided to explain an LF content reproduction method according to yet another embodiment of the present disclosure.

As shown in the drawings, when the communication unit 310 of the LF content reproduction apparatus receives and acquires an LF content from an LF content generation apparatus (S410), the image processor 320 performs image processing necessary for reproducing the LF content and reproduces the LF content (S420), and displays the LF image on THE display 340 (S430).

Figure 7:
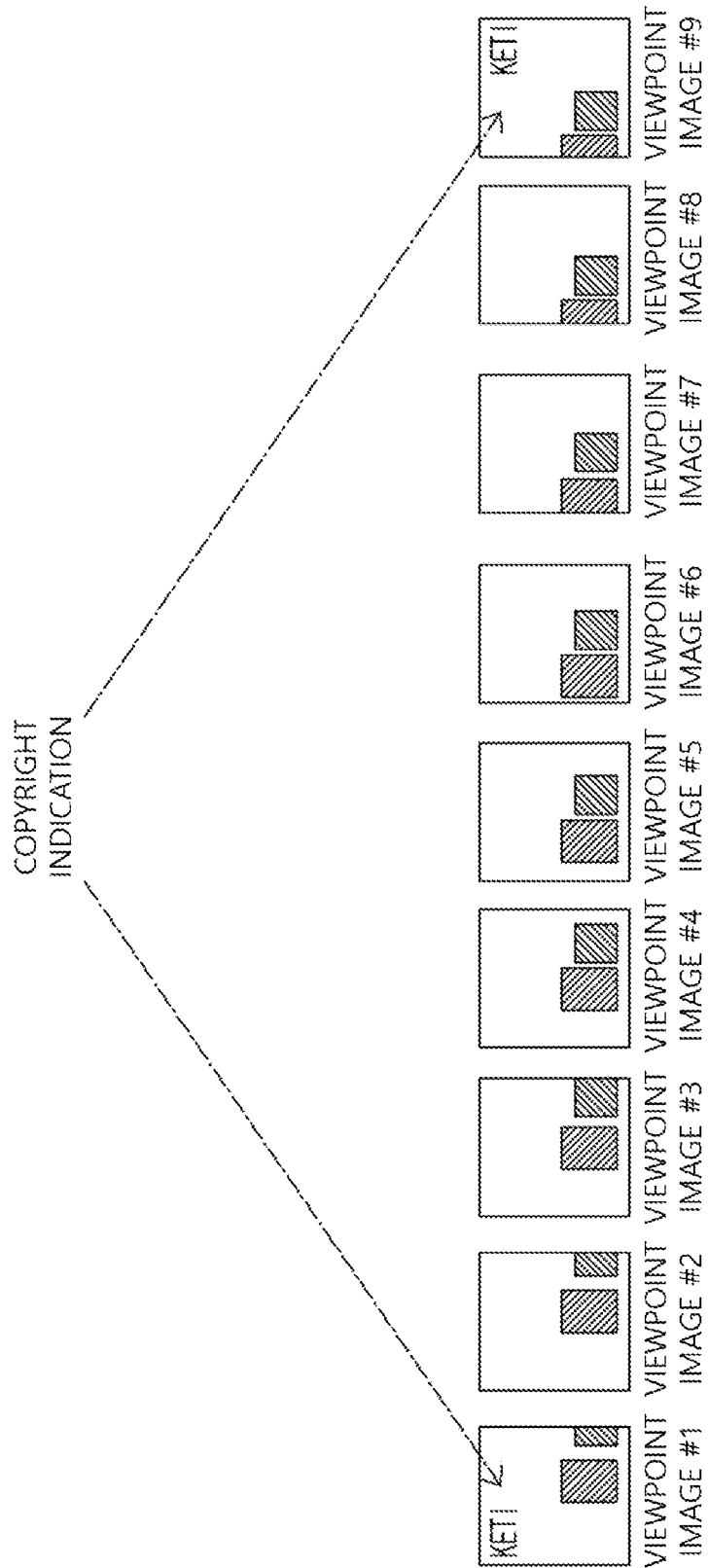
FIG. 7 is a view illustrating a displayed LF content.

FIG. 7 is a view illustrating an LF content displayed through the display 340 at step 430. As shown in the drawing, a copyright information indication "KETI" is inserted into an image of a leftmost viewpoint and an image of a rightmost viewpoint of the LF content, respectively.

Since a viewer mainly views an image of a middle viewpoint, there is almost no hindrance to viewing due to the copyright information indication. Even when the user views outermost portions, the copyright information indication is observed only by monocular visual fields, not by a binocular visual field, and thus the viewer views copyright information with a blurred vision.

Up to now, the LF content generation apparatus and method for protecting a copyright of the LF content, and the LF content reproduction apparatus and method have been described in detail with reference to preferred embodiments.

In the above-described embodiments, a copyright information indication is inserted into images of edge viewpoints of the LF content, that is, the image of the leftmost viewpoint and the image of the rightmost viewpoint, but changes may be made thereto.

For example, the copyright information indication may be inserted into only one of the image of the leftmost viewpoint and the image of the rightmost viewpoint. Furthermore, the copyright information indication may be inserted into images of other viewpoints than edge viewpoints, for example, an image of a second viewpoint from the leftmost side and an image of a second viewpoint from the rightmost side.

In addition, in the above-described embodiments, the copyright information indication is inserted into the LF content, but the technical concept of the present disclosure may be applied to insertion of other information indication than copyright information.

Furthermore, the LF content has been mentioned as one example of a multi-viewpoint image. The technical concept of the present disclosure may be applied to multi-viewpoint images of other forms than the LF content.

According to embodiments of the present disclosure, a copyright of a multi-viewpoint image content may be protected, and a copyright of an expensive multi-viewpoint image may be protected, and in this process, a hinderance to appreciation may be minimized.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A multi-viewpoint image generation method comprising:
    generating at least three or more multi-viewpoint images;
    inserting pre-defined information indication into an image of a leftmost viewpoint among the generated at least three or more multi-viewpoint images and into an image of a rightmost viewpoint among the generated at least three or more multi-viewpoint images; and
    storing the at least three or more multi-viewpoint images into which the pre-defined information indication is inserted.

2. The method of claim 1, wherein the inserting comprises inserting the pre-defined information indication into at least one of images of edge viewpoints.

3. The method of claim 1, wherein the pre-defined information indication is a copyright information indication.

4. The method of claim 1, wherein the at least three or more multi-viewpoint images are light field (LF) images.

5. A multi-viewpoint image reproduction method comprising:
    acquiring at least three or more multi-viewpoint images; and
    reproducing the acquired at least three or more multi-viewpoint images,
    wherein the at least three or more multi-viewpoint images includes a first image in which a pre-defined information indication is inserted into an image of a leftmost viewpoint among the at least three or more multi-viewpoint images, and a second image in which the pre-defined information indication is inserted into an image of a rightmost viewpoint among the at least three or more multi-viewpoint images.

6. The method of claim 5, wherein the at least three or more multi-viewpoint images are images in which a measurement information indication is inserted into at least one of images of edge viewpoints.

7. The method of claim 6, wherein the pre-defined information indication is a copyright information indication.

8. The method of claim 6, wherein the at least three or more multi-viewpoint images are light field (LF) images.

* * * * *